US006253628B1

(12) United States Patent
Steele et al.

(10) Patent No.: US 6,253,628 B1
(45) Date of Patent: Jul. 3, 2001

(54) APPARATUS FOR DRAWING LIQUIDS INTO AND EXPELLING LIQUIDS FROM A PIPET AT VARIABLE FLOW RATES

(75) Inventors: Timothy Paul Steele, Maple Grove, MN (US); James William Kenney, Broomall, PA (US)

(73) Assignee: Becton Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 09/138,260

(22) Filed: Aug. 21, 1998

(51) Int. Cl.[7] ........................................ G01N 1/00
(52) U.S. Cl. ........................................ 73/864.15
(58) Field of Search ........................ 73/864.11, 864.14, 73/864.15; 422/100

(56) References Cited

U.S. PATENT DOCUMENTS

| | | |
|---|---|---|
| D. 242,729 | 12/1976 | Kenney . |
| D. 262,319 | 12/1981 | Kenney . |
| 3,418,097 | 12/1968 | Drummond et al. . |
| 3,501,964 | 3/1970 | Drummond et al. . |
| 3,834,240 | 9/1974 | Kenney . |
| 3,834,590 | 9/1974 | Robinson et al. . |
| 3,963,061 | 6/1976 | Kenney . |
| 4,063,662 | 12/1977 | Drummond et al. . |
| 4,250,755 | 2/1981 | Kenney . |
| 4,461,328 | 7/1984 | Kenney . |
| 4,662,545 | 5/1987 | Kenney . |
| 4,896,270 | 1/1990 | Kalmakis et al. . |
| 4,905,526 | 3/1990 | Magnussen, Jr. et al. . |
| 4,926,701 | 5/1990 | Tompkins . |
| 4,967,606 | 11/1990 | Wells et al. . |
| 5,002,737 | 3/1991 | Tervamaki . |
| 5,043,106 | 8/1991 | Drummond . |
| 5,059,398 | 10/1991 | Kenney . |
| 5,090,255 | 2/1992 | Kenney . |
| 5,104,625 | 4/1992 | Kenney . |
| 5,173,266 | 12/1992 | Kenney . |
| 5,187,990 | 2/1993 | Magnussen, Jr. et al. . |
| 5,214,968 | 6/1993 | Kenney . |
| 5,294,405 * | 3/1994 | Kenney ........................ 73/863.13 |
| 5,389,341 | 2/1995 | Tuunanen . |
| 5,403,553 | 4/1995 | Heinonen . |
| 5,406,856 | 4/1995 | Kühn . |

* cited by examiner

*Primary Examiner*—Robert Raevis
(74) *Attorney, Agent, or Firm*—Nanette S. Thomas, Esq.; Arthur D. Dawson

(57) ABSTRACT

A pipet gun for drawing liquids into and dispensing liquids from a pipet which includes a variable flow valve assembly. The valve assembly includes a valve which is capable of accommodating a plurality of flow rates, and which is progressively adjustable during pipetting between a first air flow rate and a second air flow rate which is in excess of the first flow rate and which is non-progressively adjustable during pipetting to a third air flow rate which is substantially greater than the second air flow rate. The valve assembly further includes a threshold detector in the form of a spring detent, which provides an indication to the operator that the pipet gun is operating at the increased fluid rate, i.e., the "express mode" of operation.

10 Claims, 9 Drawing Sheets

APPARATUS FOR DRAWING LIQUIDS INTO AND EXPELLING LIQUIDS FROM A PIPET AT VARIABLE FLOW RATES

FIELD OF THE INVENTION

The present invention relates generally to an apparatus for drawing liquids into and expelling liquids from a pipet. More particularly, the present invention relates to an improved pipet gun, wherein liquids can be expelled from a pipet at variable rates.

BACKGROUND OF THE INVENTION

The pipetting of fluids, for example, in laboratory environments, has been accomplished by a variety of methods. Traditional mouth pipetting techniques have been abandoned in favor of a variety of mechanical pipetting devices. Various mechanical devices such as pipet guns are known which use vacuum and air pressure for aspirating and discharging fluids, for example, drawing liquids into and expelling liquids from pipets. A typical pipet gun comprises a hand-held unit in communication with a laboratory pipet at one end and connected to either a remote or local air pressure source at the other end. Trigger-operated valves located within the pipet gun regulate the flow of air through the gun and to the pipet to control either the intake or expulsion of liquid through the pipet. The operator regulates air flow to the pipet by depressing either a positive pressure trigger or a negative pressure trigger on the pipet gun. The magnitude of the pressure is typically predetermined and controlled by the valves located within the pipet gun housing. Some pipets guns are provided with a universal nose piece attachment for cooperating and communicating with pipets of various lengths and diameters.

A portable pipet gun is shown and described in U.S. Pat. No. 5,214,968. The pipet gun includes a pair of trigger-operated valves. Selective operation of the valves triggers a portable pump which establishes a vacuum to draw liquid into the pipet or creates pressure to dispense liquid from the pipet. This pipet gun, however, does not provide for any variation in speed.

It is desired for practical use of such pipet guns to provide variable flow rates, so as to control the flow rate of fluid into and out of a pipet. For instance, while a low flow rate is preferred for precise metering of liquid samples in small pipets, a low flow rate is inefficient for larger pipets. Pipet guns which are capable of variable control in the rate of liquid flow through the pipet are known in the art. For example, it is known to variably control the air pressure at the pressure source by incorporating a speed control on the pressure pump. When the motor speed of such a pump is increased, however, the pump has a tendency to jerk irregularly, causing a temporary irregular flow rate through the pipet, thereby creating the potential for error in accuracy in pipetting.

U.S. Pat. No. 3,963,061 discloses a conventional pipet gun for convenient pipetting of liquids which includes an adjustable valve for continuously variably controlling the pressure applied to the pipet from a constant pressure source. The pipet gun includes a generally pistol-grip-shaped handle portion and a pipet-supporting portion. The pipet gun is attached to a vacuum source and an air pressure source. The handle portion includes a valve assembly with two trigger-operated valves. Activation of one of the valves establishes fluid communication between the vacuum source and the pipet-supporting portion, thereby causing liquid to be drawn into a pipet connected thereto. Activation of the other valve establishes fluid communication between the air pressure source and the pipet, thereby causing liquid contained within the pipet to be expelled therefrom. The liquid flow rate through the pipet is controlled by limiting the extent to which the trigger on the gun is depressed. In this manner, the operator may rapidly fill or void a major portion of the pipet by depressing the trigger fully or may slowly meter the pipet by depressing the trigger slightly.

In the pipet gun disclosed in the U.S. Pat. No. 3,963,061, the full range of liquid flow rates is achieved over the action path or depression stroke of the trigger. Due to the wide range of liquid flow rates and the limited action path of the trigger, however, slight movements of the trigger in such pipet guns produce significant changes in the liquid flow rate, which may result in ineffective pipetting procedures. Further, there is no indication for the operator to determine when the flow rate changes beyond a desired value.

U.S. Pat. No. 5,294,405, incorporated herein by reference, discloses an improved pipet gun having a wide range of liquid flow rates and avoids the "piston effect" of earlier devices by including adjustable valves for controlling the flow of liquid. In the pipet gun disclosed in the U.S. Pat. No. 5,294,405, the valves which control the air pressure and thus control the flow of liquid into and out of the pipet are adjustable between a plurality of flow rates. The valves slide longitudinally within a valve chamber. The valves operate by closing off the valve chamber from venting to ambient air, thus forcing air pressure which is directed into the valve chamber from an air pressure source into the pipet. When the adjustable valve is set on any one of the flow rates, for example slow, medium or fast, the pipet can be filled or emptied at that general flow rate. Further, the flow rate of the gun can be progressively increased over the path of the trigger by including tapering grooves along the valve body, which permit a graduation in the amount of air flow directed to the pipet. Such pipet guns, however, while extremely useful in pipetting fluids at a variety of flow rates, cannot effectively be adjusted from one general flow rate to another during expulsion of the liquid from the pipet, due to the risk of leakage and thus, can result in inaccurate pipetting. Further, while the valve attempts to close off the chamber from venting to ambient air over the entire path of the trigger, an effective airtight seal is not established, since the valve and valve chamber are typically constructed of plastic materials, thus decreasing the efficiency of the pipet gun. Additionally, while progressively increasing flow rates over the path of the trigger are useful, there is no indication for the operator to determine when the flow rate increases beyond a desired flow rate threshold.

While pipet guns having a wide range of flow rates utilizing only one flow rate at any particular trigger setting are useful, it is oftentimes desirable to significantly increase the flow rate of the liquid, specifically during expulsion of the liquid, for instance, to dislodge or "wash down" cells or particles attached to the side walls of a container while pipetting into the container.

Thus, it is apparent that a need exists for a pipet device which is capable of pipetting liquids at a variety of first flow rates, which is capable of adjustment during pipetting to a second flow rate which is in excess of the first flow rate and which is capable of distinguishing when a threshold is reached between a first flow rate and a second flow rate in excess of the first flow rate, without the problems associated with prior variable speed pipet devices, such as progressive changes in flow rate over the length of activation of the valve means.

SUMMARY OF THE INVENTION

It is an object of the present invention to provide an improved pipet gun which is capable of drawing liquids into and expelling liquids from a pipet at progressively changing air flow rates, and at a distinct non-progressively changing air now rate which is substantially greater than the prior air flow rates.

It is a further object of the present invention to provide a pipet gun which is capable of detecting when the air flow rate changes from a first air flow rate to a second air flow rate which is different than the first air flow rate.

These and other objects are obtained through the present invention which provides a pipet gun for pipetting fluids into and out from a pipet including a gun housing, a pipet support coupled to the housing for supporting a pipet to the housing, air pressure supply means in communication with the pipet support for selectively supplying air pressure flow to the pipet for effecting the pipetting of fluids; and regulating means supported by the housing for operably regulating the flow rate of air pressure supplied to the pipet. The regulating means includes a manually-actuated trigger-operated valve, which is continuously movable to progressively change the air flow rate from a first air flow rate to a second air flow rate which is greater than the first air flow rate, and the valve is further movable to a final position to non-progressively change the air flow rate from the second air flow rate to a third air flow rate which is substantially greater than the second air flow rate.

The valve may selectively adjustable among plural discrete positions so as to establish selected plural different air flow rates. The air pressure supply means may include an air pressure source and an air conduit between the air pressure source and the pipet support, with the valve being interposed between the air pressure source and the pipet along said conduit. The valve may also include a valve opening alignable with the conduit so as to permit the change in air flow rates. Such a valve opening may be elongate, having a progressively greater opening dimension along the length thereof to permit the progressive change in air flow rate from the first flow rate to the second flow rate.

The pipet gun may further include a valve chamber for accommodating the valve, with the valve chamber having an opening for accommodating the valve for progressive movement of the valve therein. An elastomeric sealing means such as a rubber o-ring may be interposed adjacent the valve chamber for sealing the chambers opening upon movement of the valve to its final position. Such movement of the valve to its final position establishes the third air flow rate.

Additionally, a spring detent is also provided for engagement with the manually-actuated trigger-operated valve. The spring detent provides a means of detecting when the value is in its final position

DETAILED DESCRIPTION

Figure 1:
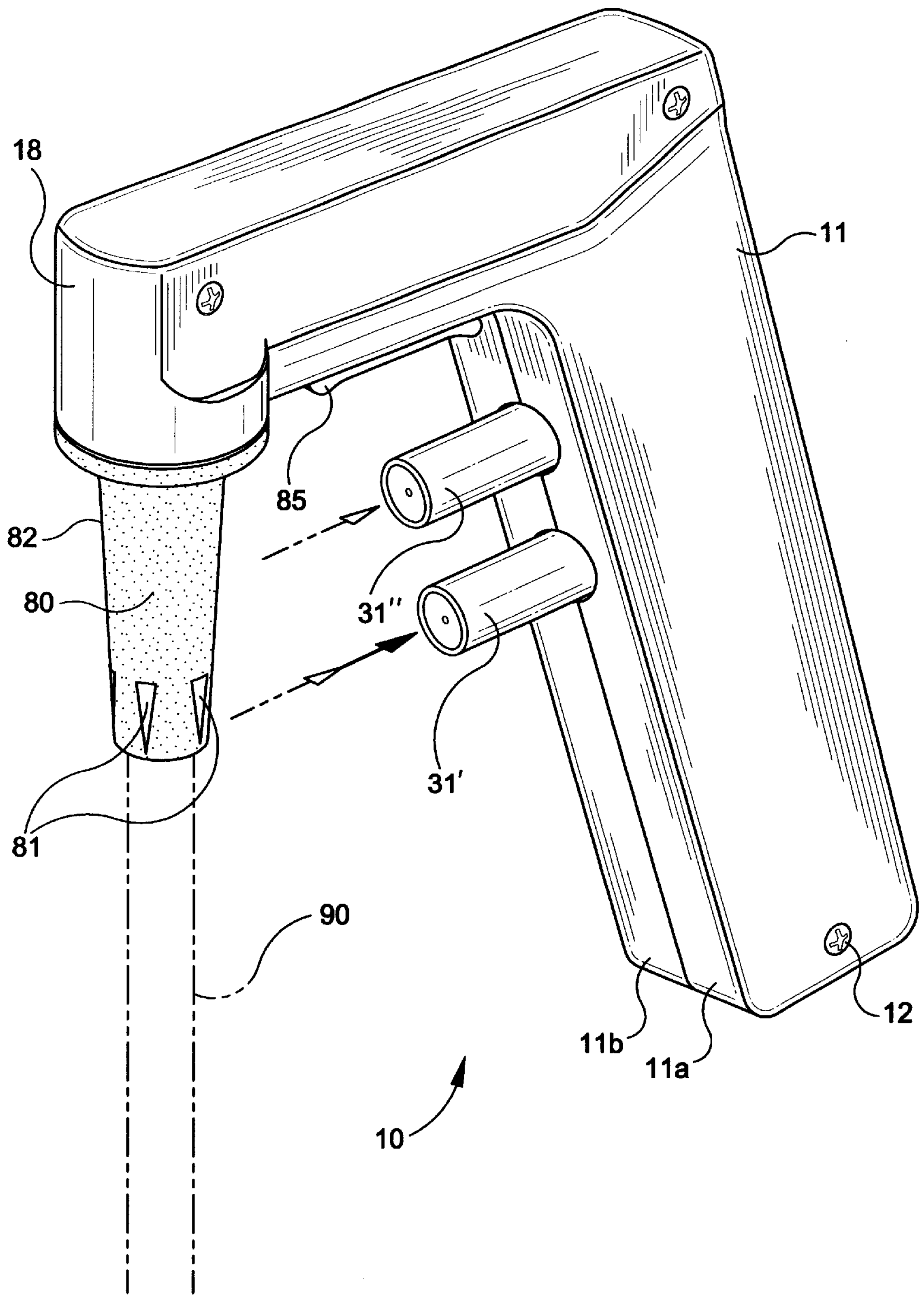
FIG. 1 is a perspective view of the variable flow pipet gun of the present invention.
Figure 9:
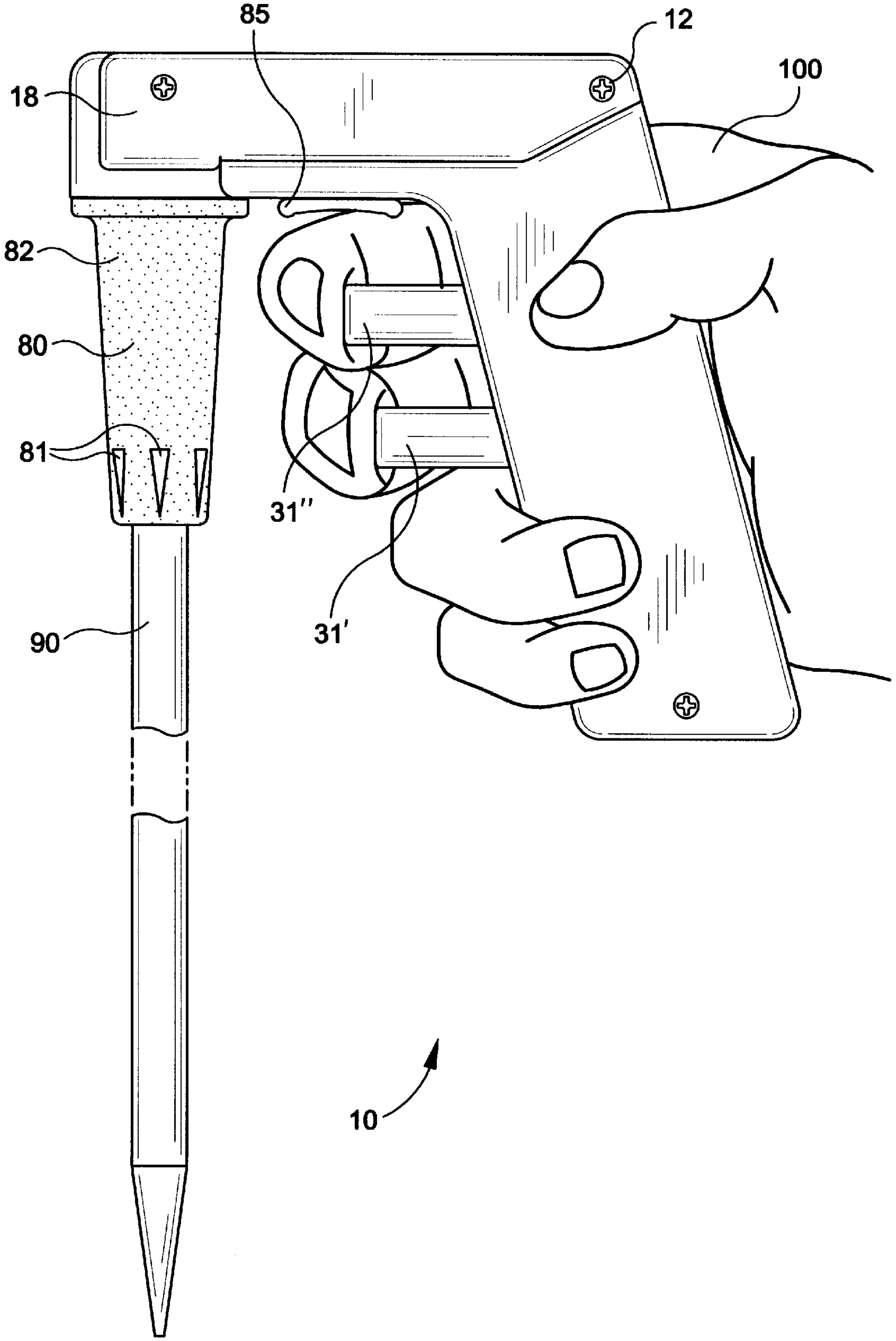
FIG. 9 is a side view of the apparatus of the present invention in use in combination with a pipet.

A pipet gun in accordance with the present invention is shown generally at FIGS. 1 and 9. Pipet gun 10 includes a generally hollow body 11 having pipet support 80 attached thereto. Body 11 may be constructed of any material known in the art. Preferably, body 11 is constructed of plastic material molded into two distinct body halves 11*a* and 11*b*, which are secured by screws 12. Most preferably, body 11 includes a matte finish on the external surface thereof, thus providing a non-slip outer surface which is easily handled by hand 100.

Pipet support 80 includes a cylindrical outer housing 82, the upper portion of which may be reduced and threaded for engagement within a complementary portion of body 11 of pipet gun 10 at arm 18. Pipet gun 10 may further be provided with pipet support release 85, which engages and releasably secures pipet support 80 thereto. The inner surface of pipet support 80 preferably includes a housing made of rubber or other frictional elastomeric material, and tapers inwardly from the lower end to the upper end of the pipet support. The inner surface of pipet support 80 is configured to selectively engage and frictionally hold pipets 90 of various sizes within the pipet support 80 in a known manner. Pipet support 80 may further be provided with alignments 81, for properly aligning a pipet thereto, as disclosed in commonly assigned U.S. Pat. No. 5,563,356. Pipet support 80 may further be provided with a filter assembly for filtering liquids which may be undesirably drawn into pipet support 80 during use.

Figure 2:
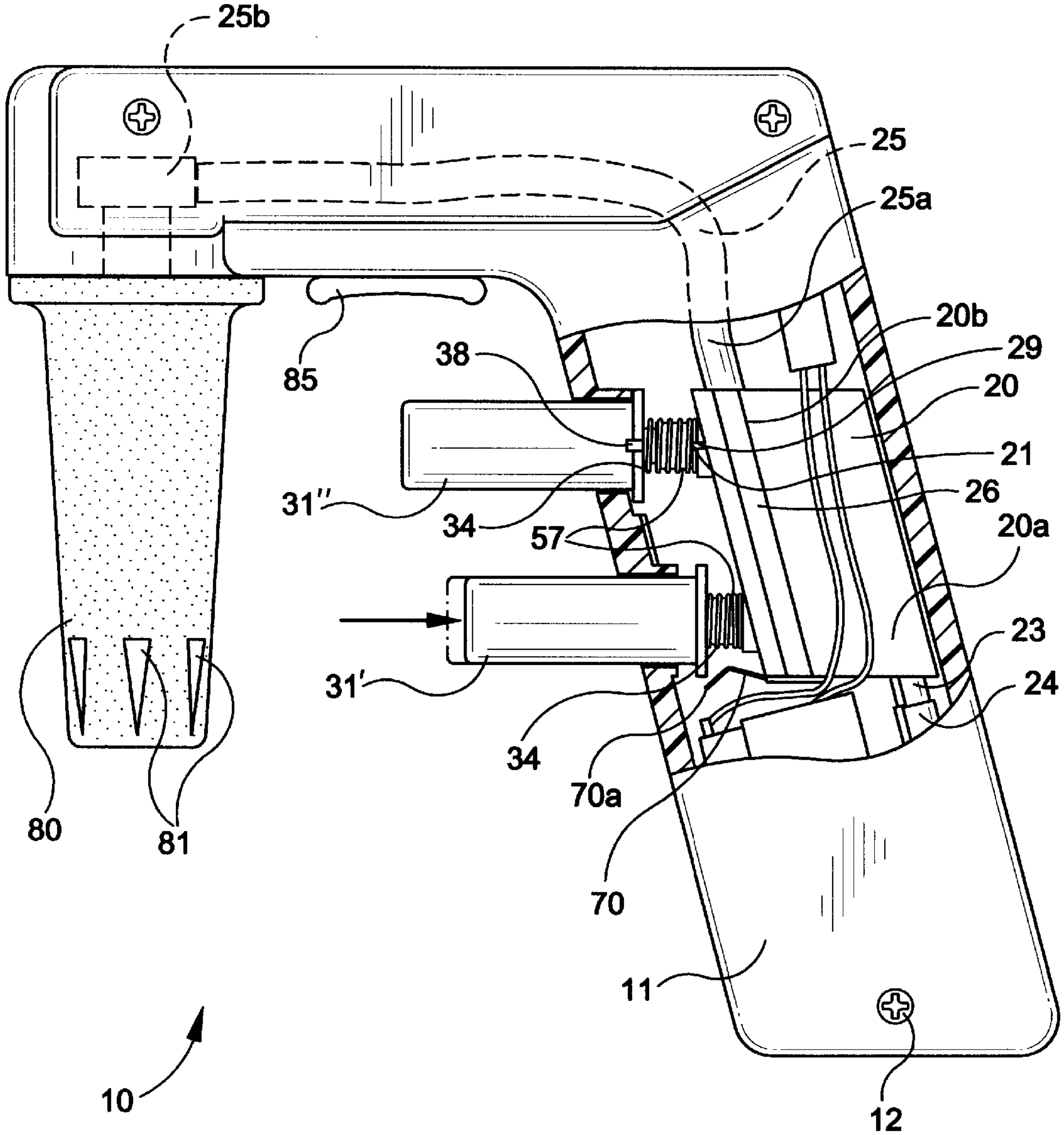
FIG. 2 is a side view of the pipet gun of FIG. 1 with a cut-away portion to depict the valve assembly in a first activated position.
Figure 3:
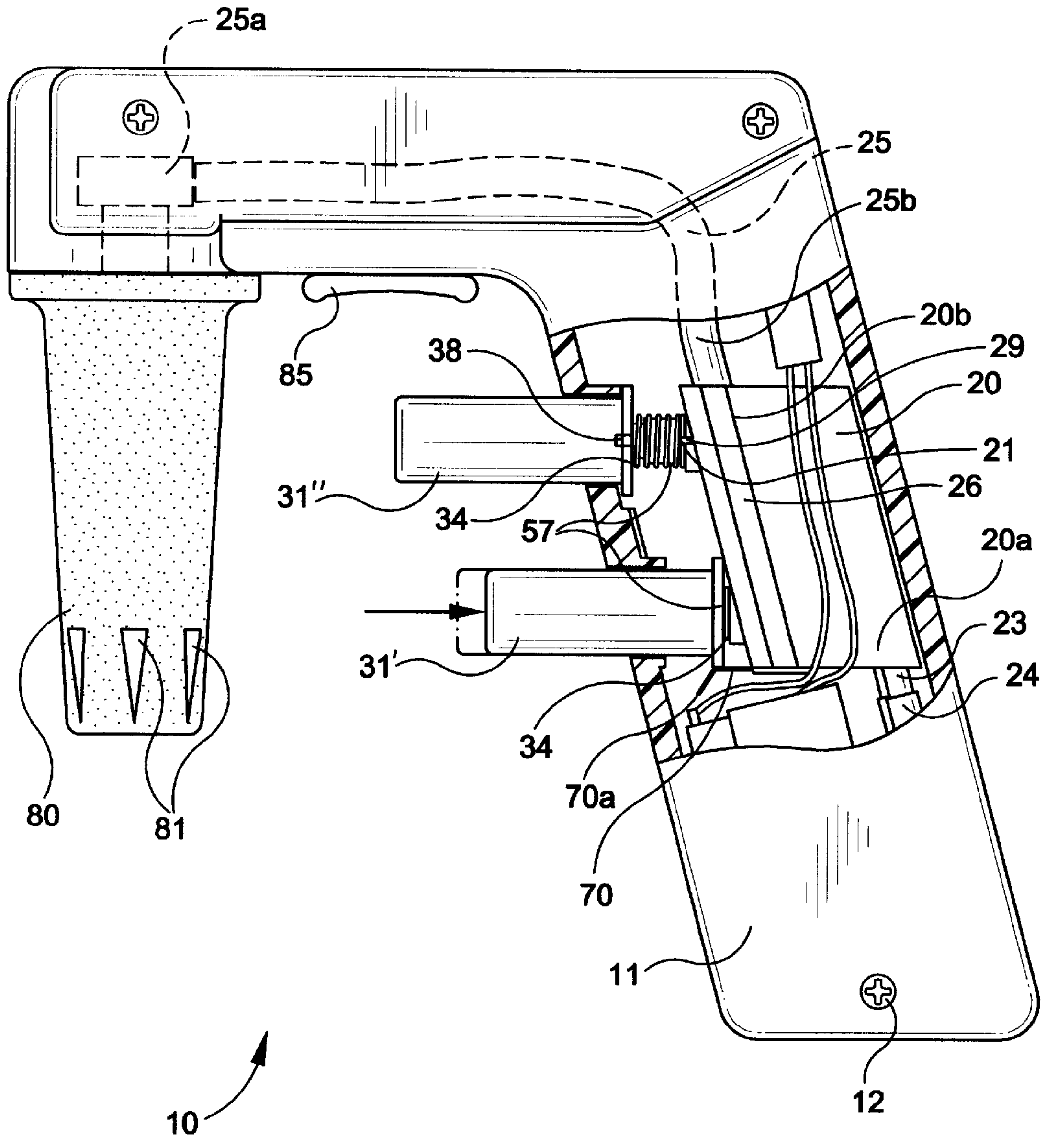
FIG. 3 is a side view of the apparatus of the pipet gun similar to FIG. 2, with a cut-away portion to depict the valve assembly in a second activated position.

Pipet gun 10 includes regulating means supported by body 11, which is capable of operably regulating flow of air to pipet 90. As shown in FIGS. 2 and 3, pipet gun 10 includes regulating means in the form of valve assembly 20 within body 11. Valve assembly 20 is connected at one portion 20*a* to a positive air pressure source (not shown) via pressure duct 23 and a negative air pressure source, i.e. a vacuum source (not shown) via vacuum duct 24, and is connected at an opposed portion 20*b* to a pipet flow duct 25. The air pressure source and vacuum source can be provided externally of body 11, or can preferably be incorporated directly within body 11 in a known manner. In most preferred embodiments, the air pressure source is a single source which is capable of selectively supplying positive and negative air pressure. A pipet flow duct 25 is connected to valve assembly 20 at one end 25*a*, extends through body 11 of pipet gun 10 and is connected at second end 25*b* to pipet support 80. Fluid communication through pipet flow duct 25 is therefore established between valve assembly 20 and pipet 90 attached to pipet support 80.

Figure 4:
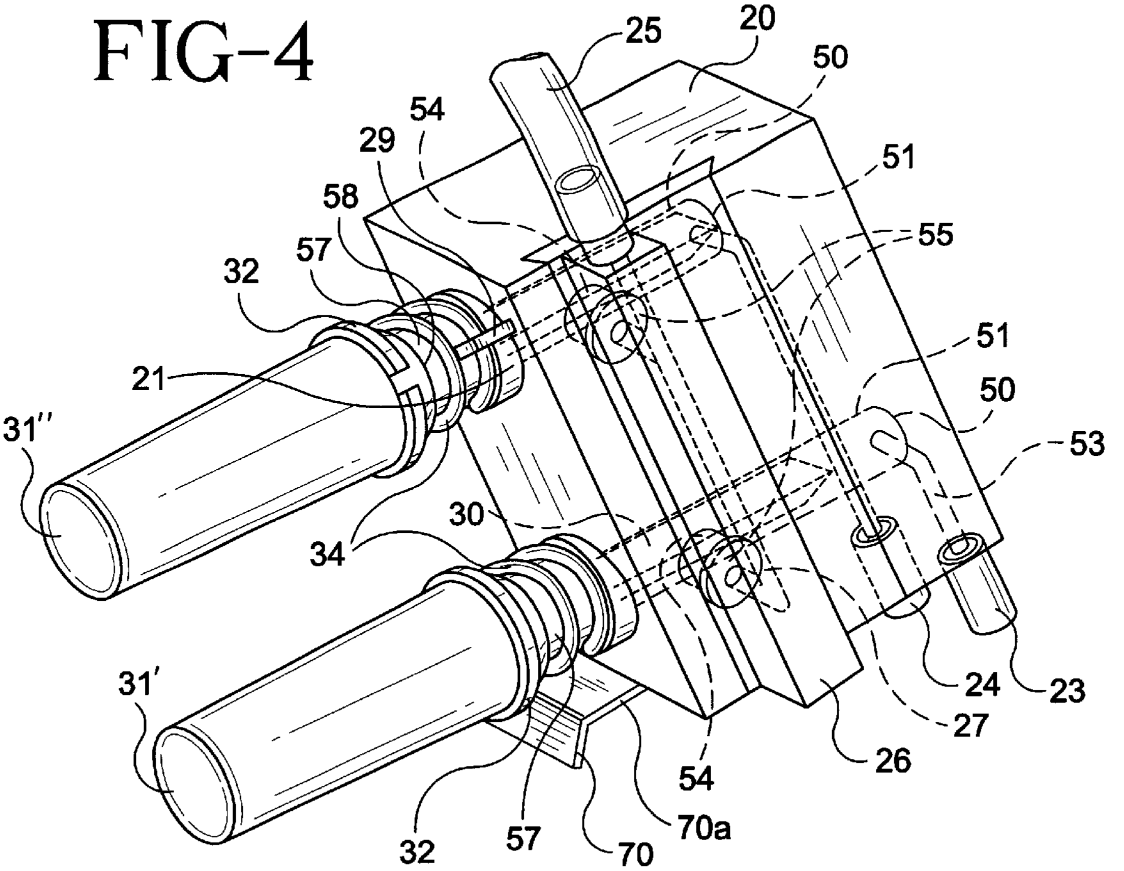
FIG. 4 is an enlarged perspective view of the valve assembly shown in FIGS. 2–3.
Figure 5:
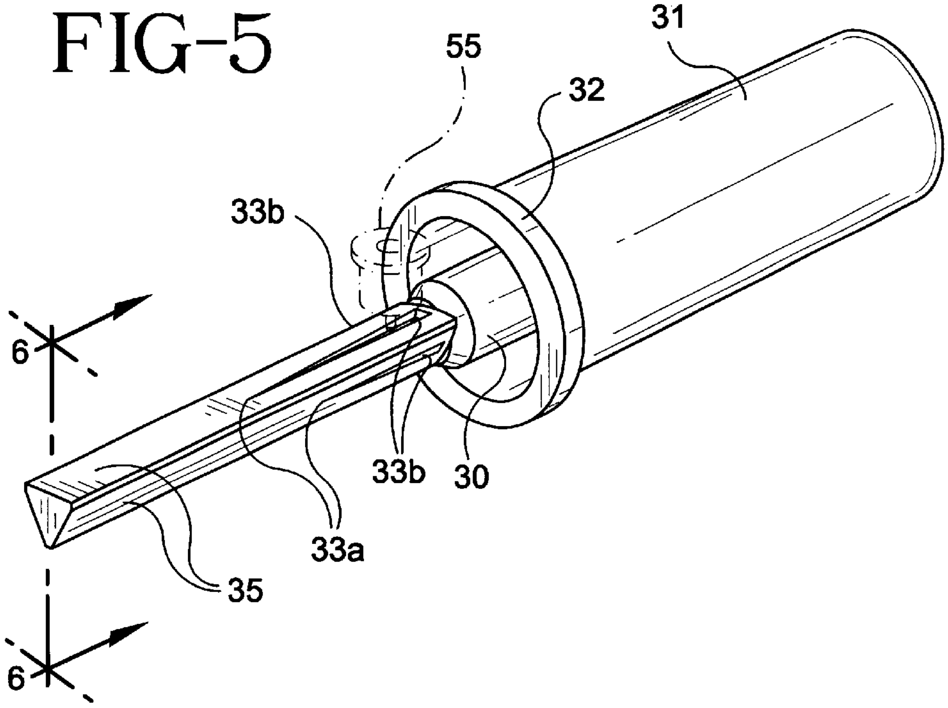
FIG. 5 is an enlarged perspective view of a sliding valve of the Valve assembly shown in FIG. 4.
Figure 6:
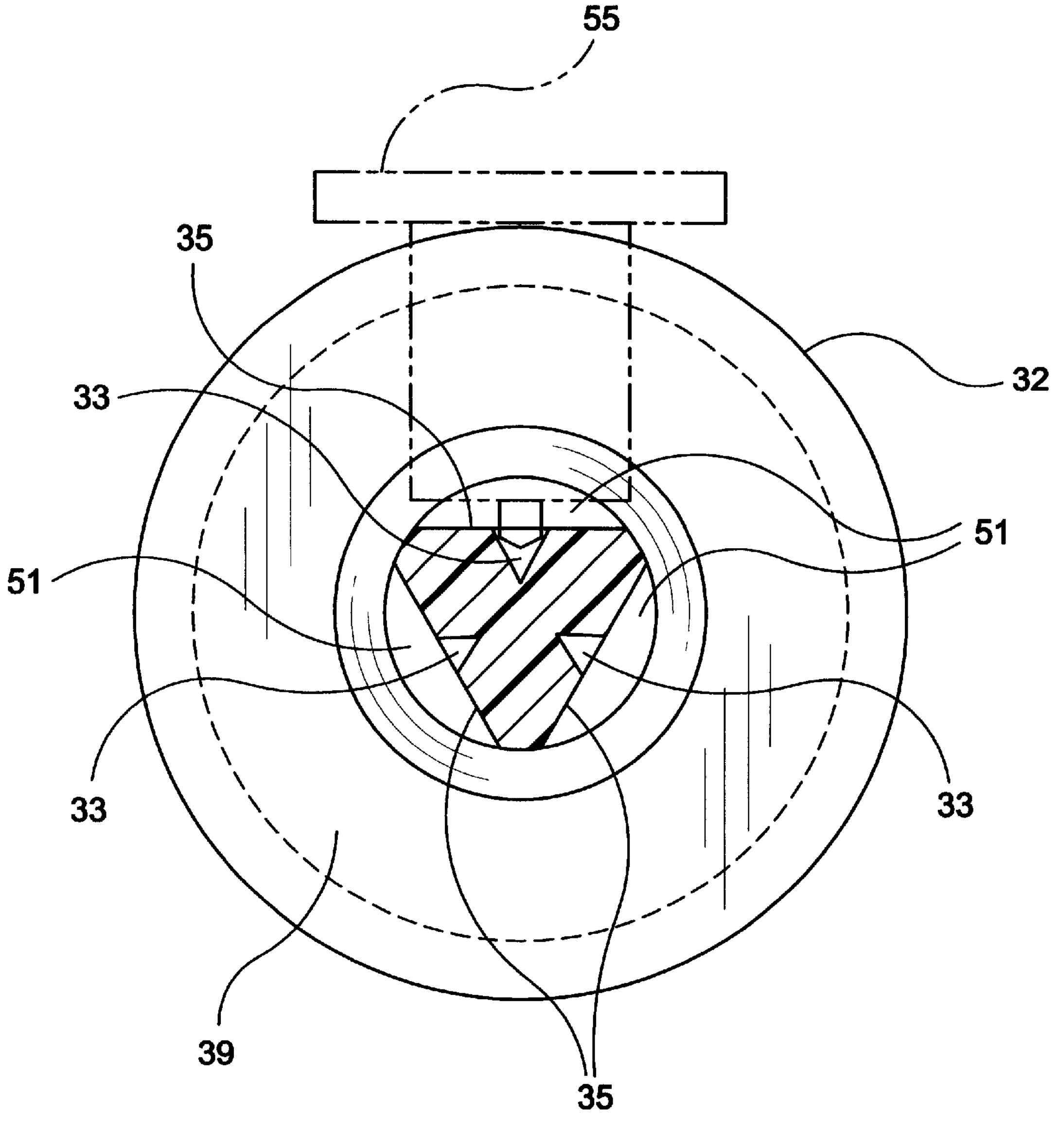
FIG. 6 is an end view of the sliding valve taken along line 6—6 of FIG. 5.

As depicted in further detail in FIGS. 4–6, valve assembly 20 includes an assembly body 21 having a pair of elongate open-ended valve chambers 50. Valve chambers 50 are of generally longitudinal configuration having a generally cylindrical valve chamber wall 52 which defines a chamber bore 51 having an open end 58. Valve chamber wall 52 extends outwardly from valve assembly 20 to form extension sleeve 57. Valve chamber 50 includes flow port 55 at one portion thereof which defines chamber flow opening 54 extending through valve chamber wall 52 and further includes a second port which defines duct opening 53 extending through valve chamber wall 52 at an opposed portion thereof. Valve chamber 50 is configured for attachment to pressure duct 23 and vacuum duct 24 at duct opening 53, in order to provide fluid communication between chamber bore 51 and an air pressure source or vacuum source connected to pressure duct 23 or vacuum duct 24 through duct opening 53. Flow port 55 is configured for attachment to pipet flow duct 25 in order to provide fluid communication between chamber bore 51 and pipet 90 attached to pipet support 80 through chamber flow opening 54. In preferred embodiments, pipet flow duct 25 includes duct extension 26, shown in FIG. 4, including extension conduit 27 extending therethrough. Extension conduit 27 attaches to flow port 55, thereby providing fluid communication between chamber flow opening 54 and pipet flow duct 25 through extension conduit 27.

It is contemplated through the present invention that valve assembly 20 includes two separate valve chambers 50 for accommodating two separate valves 30 therein. One of the valve chambers regulates air flow between pipet 90 and a positive air pressure source (not shown), while the other of the valve chambers regulates air flow between pipet 90 and a negative air pressure source, or vacuum (not shown). The valve chambers are identified in the Figures with the same reference characters. The valve triggers 31 (discussed in more detail herein), however, have been given the reference characters 31' and 31" to differentiate between the pressure valve trigger and vacuum valve trigger, respectively. In such embodiments incorporating two separate valve chambers 30, one of the valve chambers 30 is connected at duct opening 53 to vacuum duct 24 which in turn is connected to a vacuum source (not shown), while the other of the valve chambers 30 is connected at duct opening 53 to pressure duct 23 which in turn is connected to an air pressure source (not shown). As such, one valve element provides means for establishing a vacuum to pipet 90 while the other valve element provides means for establishing air pressure to pipet 90, as will be discussed in more detail herein. As noted, in preferred embodiments, pipet flow duct 25 includes duct extension 26, shown in FIG. 4, including extension conduit 27 extending therethrough. In embodiments incorporating two separate valve chambers, extension conduit 27 attaches to chamber flow openings 54 of both valve chambers, thereby providing means for distinctly attaching both valve chambers 50 at chamber flow openings 54 to pipet flow duct 25.

Valve assembly 20 further includes valve 30 positioned within chamber bore 51 of valve chamber 50. Valve 30 includes a valve stem 30*a* and a manually actuatable valve trigger 31. Valve stem 30*a* extends longitudinally within chamber bore 51 in sliding engagement along valve surface 35. Valve trigger 31 extends externally of assembly body 21 and also partially externally of housing body 11. Valve trigger 31 includes valve trigger rim 32 which is positioned within body 11, thereby providing a means for holding valve trigger 31 in place within the pipet gun. Valve trigger 31 is manually depressable to slidably displace valve stem 30*a* longitudinally within chamber bore 51. Valve assembly 20 further includes a coil spring 34 positioned about valve stem 30*a* and retained between valve trigger rim 32 and assembly body 21. Spring 34 exerts a spring bias on valve trigger 31. Valve trigger 31 is movable against the bias of spring 34 to move from a first non-operated position, as shown generally in FIG. 1, to a second partially-operated position, as shown in FIG. 2. Upon release of trigger 31, spring 34 returns valve stem 30*a* and valve trigger 31 to their inoperable positions after operation of valve 30, as will be discussed in more detail with reference to operation of the pipet gun herein.

Valve 30 sealingly engages flow port 55 at pressure chamber flow opening 54, thereby providing a means for sealingly closing opening 54 when valve surface 35 is in contact with flow port 55. Preferably, flow port 55 includes a sealing member, for example, a rubber "O-ring" for establishing such sealing engagement.

As shown in more detail in FIGS. 5 and 6, valve 30 has a generally triangular cross-sectional shape defining three valve surfaces 35. While the present embodiment is shown including three valve surfaces 35, it is contemplated that valve 30 can include any number of valve surfaces 35, each of which can provide a different flow rate, as will be discussed in more detail herein.

Valve stem 30*a* of valve 30 further includes an elongated notched or grooved portion 33 extending along a length of valve surface 35. It is contemplated that such grooves 33 extend along a length of each of the surfaces of valves 30. It is further contemplated that each of grooves 33 extending along the length of the valve surface 35 is of a different size or dimension, i.e., is of greater width or depth, than the other of grooves 33. As such, each of the grooves 33 provides for a different level of fluid communication between chamber bore 51 and chamber flow opening 54, as will be discussed in more detail herein.

Since valve 30 is slidable within chamber bore 51, valve surface 35 engages flow port 55 along the length of valve surface 35. When valve 30 is operated to slide longitudinally within chamber bore 51, valve surface 35 slides from a first position in which it contacts and sealingly engages flow port 55, thereby sealing off chamber flow opening 54, to a second position, in which groove 33 of valve surface 35 is in alignment and in register with flow port 55 and, therefore, chamber flow opening 54. By including groove 33 along a length of valve surface 35, when groove 33 is in register with flow port 55, fluid communication is established between chamber flow opening 54 and chamber bore 51 through groove 33.

As noted above, it is contemplated that valve 30 can include multiple valve surfaces 35. In such an embodiment, each of such valve surfaces 35 can provide a different flow rate for pipet gun 10. For instance, one of such valve surfaces 35 can include a longitudinal groove 33 of a generally narrow width and/or shallow depth, with another of such valve surfaces 35 having groove 33 with a slightly wider width and/or deeper depth, and a third of such valve surfaces 35 having yet a slightly wider width and/or deeper depth. The first smaller groove 33 provide a generally low flow rate, while the second and third grooves provide progressively increasing flow rates. In such preferred embodiments, valve 30 is rotatable around a center longitudinal axis, with rotation of valve 30 causing one of the valve surfaces 35 to engage flow port 55. Furthermore, valve trigger 31 is preferably fixedly attached to valve 30. Thus, by turning valve trigger 31 rotationally between a plurality of trigger positions, valve 30 rotates around its longitudinal axis, thereby alternating engagement between each of the valve surfaces 35 and flow port 55. Thus, variable levels of flow rates can be provided for each trigger position, with plural discrete trigger positions establishing plural different air flow rates. Further, indicia may be provided on the outer surface of valve trigger 31 which provide an indication to the operator as to which flow rate the valve trigger is set to operate, for instance, indications S, M and F may be provided on the surface of valve trigger 31 to represent slow, medium and fast flow rate settings, respectively.

Figure 7:
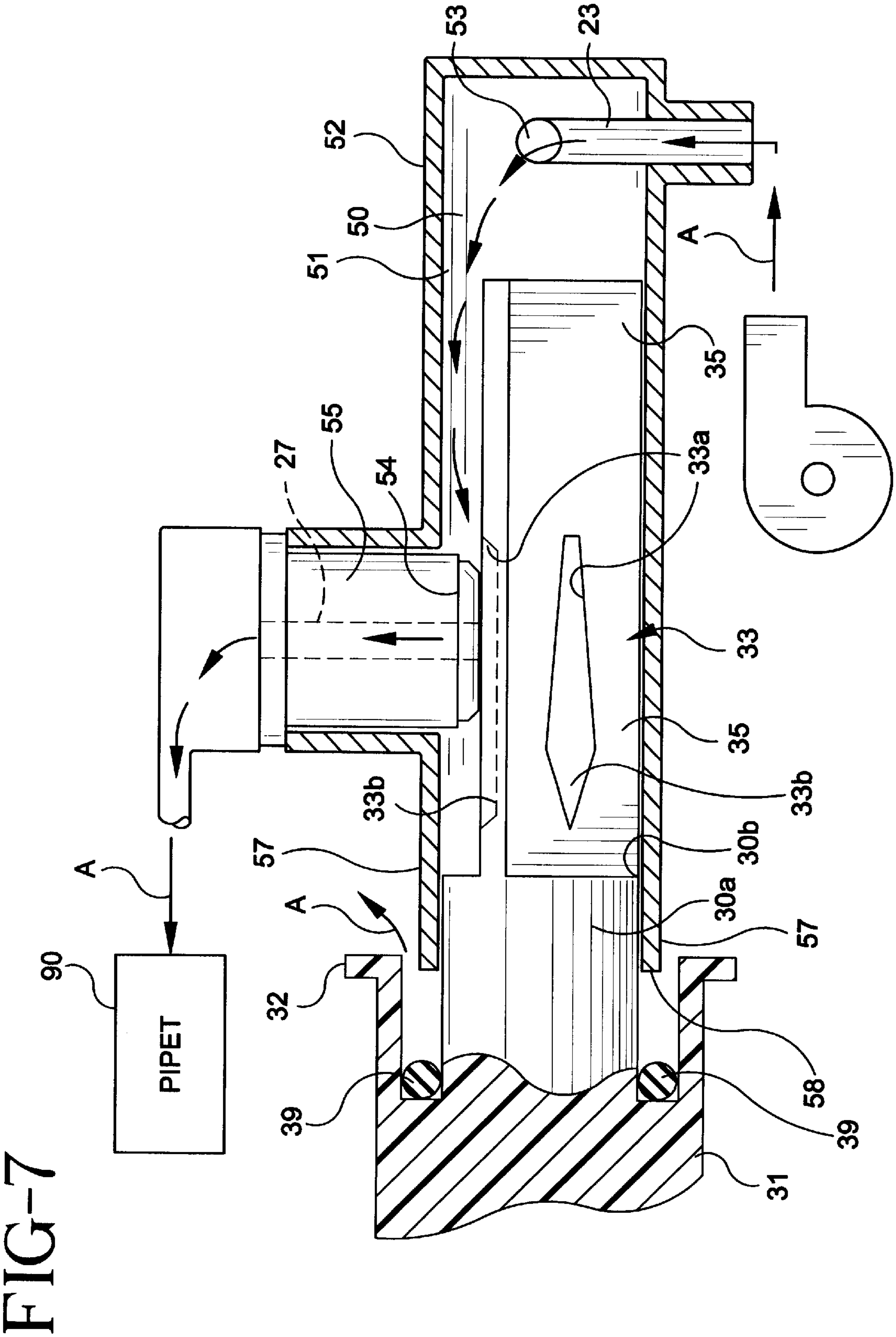
FIG. 7 is a schematic view of the operation of a valve of the present invention in one position establishing fluid communication between an air pressure source and a pipet.

As depicted in FIGS. 5 and 7, groove 33 is gradually tapered from a small groove portion 33*a* to a progressively larger groove portion 33*b*. When groove 33 is in register with chamber flow opening 54, such large groove portion 33*b* permits a larger amount of fluid communication between chamber flow opening 54 and chamber bore 51 than small groove portion 33*a*. Such a larger amount of fluid communication results in an increased air flow rate when large groove portion 33*b* is in registry with chamber flow opening 54. Further, the gradual tapering of groove 33 from small groove portion 33*a* to large groove portion 33*b* provides for progressively variably increasing fluid communication between valve chamber 50 and chamber flow opening 54 along the length of groove 33, thus providing a progressively variable flow rate during operation. Furthermore, when a plurality of valve surfaces 35 are used as described, each groove 33 in each valve surface 35 can include a tapered groove 33, thereby providing for variably increased fluid communication between valve chamber 50 and chamber flow opening 54 at a variety of general flow rates. It is also contemplated that groove 33 may be step-shaped, thus progressively changing in a step-wise fashion from a small groove portion to a larger groove portion without a gradual transition.

As noted, extension sleeve 57 extends from chamber wall 52 and valve assembly 20. Valve stem 30*a* extends within extension sleeve 57 and is slidable within chamber bore 51. Valve stem 30*a* further includes stem portion 30*b* which perimetrically engages the interior surface of chamber wall 52 of valve chamber 50, as shown in FIG. 7. While such engagement closes off chamber 50, air within chamber 50 is still capable of venting to ambient air, since such point of engagement is not effectively sealed. Thus, while valve trigger 31 may be fully depressed for effecting a high flow rate, pressurized air within valve chamber 50 still vents at the point of engagement of stem portion 30*b* and chamber wall 52 at extension sleeve 57. This would result in less than maximum flow being provided through flow opening 54. The present invention provides for complete sealing of valve chamber 50 to effect an increase in the flow rate to the maximum flow rate. In order to effect such sealing, valve 30 may further include valve o-ring 39 adjacent valve trigger rim 32 of valve trigger 31. Valve o-ring 39 is constructed of a material capable of establishing a sealing engagement between adjacent members. Preferably, valve o-ring 39 is constructed of rubber or other elastomeric material. Valve o-ring 39 is positioned such that, when valve trigger 31 is fully depressed, valve o-ring 39 sealingly engages extension sleeve 57. Such sealing engagement effectively seals off valve chamber 50 from the ambient air, thus preventing air therein from venting to the ambient air when valve trigger 31 is fully depressed. Thus, sealing of valve chamber 50 with valve o-ring 39 provides for a non-progressive change in the air flow rate, creating a flow rate which is substantially greater than the previous flow rate. As such, when valve o-ring 39 is included for use with pressure trigger 31', the air pressure which is supplied to valve chamber 50 by way of the air pressure source is entirely and exclusively directed through pipet flow duct 25 and into pipet 90, thereby establishing an effective flow rate for pipet 90 which is in excess of any flow rate accomplished along the path of valve 30 when valve o-ring 39 is not sealingly engaging extension sleeve 57. Furthermore, when valve o-ring 39 is included for use with vacuum trigger 31", the vacuum which is supplied to valve chamber 50 by way of the vacuum source entirely and exclusively draws air from pipet 90 through pipet flow duct 25, thereby establishing an effective vacuum flow rate for pipet 90 which is in excess of any flow rate accomplished along the path of valve 30 when valve o-ring 39 is not sealingly engaging extension sleeve 57.

Valve assembly 20 can be further provided with a threshold detector in the form of spring detent 70, which is capable of engagement with valve trigger rim 32. Spring detent 70 is provided for use with valve assembly 70 to engage with valve trigger rim 32 when valve 30 is longitudinally displaced within valve chamber 50 beyond small groove portion 33*a* to large groove portion 33*b*, and when valve o-ring 39 sealingly engages extension sleeve 57. Thus, spring detent 70 provides a means for detecting when large groove portion 33*b* is in registry with flow port 55 and chamber flow opening 54, and when air is sealed off from venting to ambient air, and therefore provides a means for detecting the flow rate threshold, i.e., when the increased rate of flow is provided to pipet 90. Preferably, spring detent 70 includes apex 70*a*, which, when engaged by valve trigger rim 32, causes a click which can be heard and/or felt by the pipet gun operator. In embodiments incorporating a plurality of valve surfaces 35 each having a groove 33 of a different size, it is preferable that the transition point between small groove portions 33*a* and large groove portions 33*b* are aligned perimetrically about the longitudinal axis of valve 30, such that spring detent 70 will consistently provide a means for detecting when large groove portion 33*b* is in registry with flow port 55 and when valve o-ring 39 sealingly engages extension sleeve 57, regardless of which setting, i.e., valve surface 35, is selected. While spring detent 70 is shown herein in terms of a preferred embodiment as capable of engagement with valve trigger rim 32 of pressure trigger 31', it is further contemplated that spring detent 70 could also used in conjunction with vacuum trigger 31" in a pipet gun incorporating a pressure valve and a vacuum valve.

Valve assembly 20 may further be provided with shoulder 29 extending therefrom adjacent extension sleeve 57 and chamber bore 51. Shoulder 29 extends from valve assembly 20 and is capable of contacting valve trigger rim 32 of valve trigger 31 in such a manner that it prevents full depression of valve trigger 31. When valve trigger 31 is depressed and valve trigger rim 32 contacts shoulder 29, shoulder 29 provides a stop surface, thereby preventing valve 30 from being further displaced within chamber bore 51, and preventing valve o-ring 39 from contacting and sealingly engaging extension sleeve 57, which prevents sealing of valve chamber 50 from ambient air. As such, shoulder 29 provides an effective stop for preventing valve 30 from causing pipet gun 10 to be operated at maximum flow rate. Valve trigger 31 may further include structure to permit non-engagement of valve trigger rim 32 with shoulder 29, such as shoulder notch 38 extending from valve trigger rim 32 through valve trigger 31. Shoulder notch 38 is capable of accommodation of shoulder 29, thereby permitting full depression of valve trigger 31, which in turn permits full displacement of valve 30 within chamber bore 51 and further permits sealing engagement of valve o-ring 39 with extension sleeve 57. As noted above, it is contemplated that valve 30 can include multiple valve surfaces 35, each of which are capable of providing a different variable flow rate for pipet gun 10. Further, it is noted that rotation of valve trigger 31 causes rotation of valve 30, which alternates engagement between valve surfaces 35 and flow port 55, which permits selection between the various general flow rates. It is further contemplated by the present invention that valve trigger 31 can be provided with shoulder notch 38 for engagement with shoulder 29 at any individual valve trigger setting which provides for the variable levels of flow rates, for instance, when specific flow rates are selected by rotating valve trigger 31, shoulder notch 38 is capable of engagement with shoulder 29 when valve trigger 31 is fully depressed, while shoulder notch 38 is not provided at other specific flow rates, thereby preventing valve trigger 31 from being fully depressed due to valve trigger rim 32 abutting shoulder 29. As such, the full flow rate can be accomplished at some general flow rate settings, while the full flow rate is not seen at other general flow rate settings. Further, while it is noted that separate valve triggers 31' and 31" can be used for control of air pressure and vacuum pressure, respectively, it is contemplated that shoulder notch 38 can be provided on any of pressure valve trigger 31' or vacuum trigger 31". Still further, it is contemplated that shoulder notch 38 can be incorporated into the valve assembly in conjunction with spring detent 70, such that the full flow rate can be accomplished and detected (by spring detent 70) at some general flow rate settings and not at others. In most preferred applications, pipet gun 10 is provided with pressure trigger 31' and vacuum trigger 31", each of which are capable of alternating between three general variable flow rate settings, i.e. slow, medium and fast, with shoulder notch 38 being incorporated for use with vacuum trigger 31" when set at only the fast setting, and spring detent 70 incorporated for use with pressure trigger 31'. Such an embodiment permits full negative air pressure, i.e. vacuum, only during the fast setting for drawing liquids into pipet 90, and permits full positive air pressure during any of the slow, medium or fast settings when expelling liquids from pipet 90, and further provides indication as to when such full positive air pressure is accomplished during expelling of liquids from pipet 90.

Figure 10:
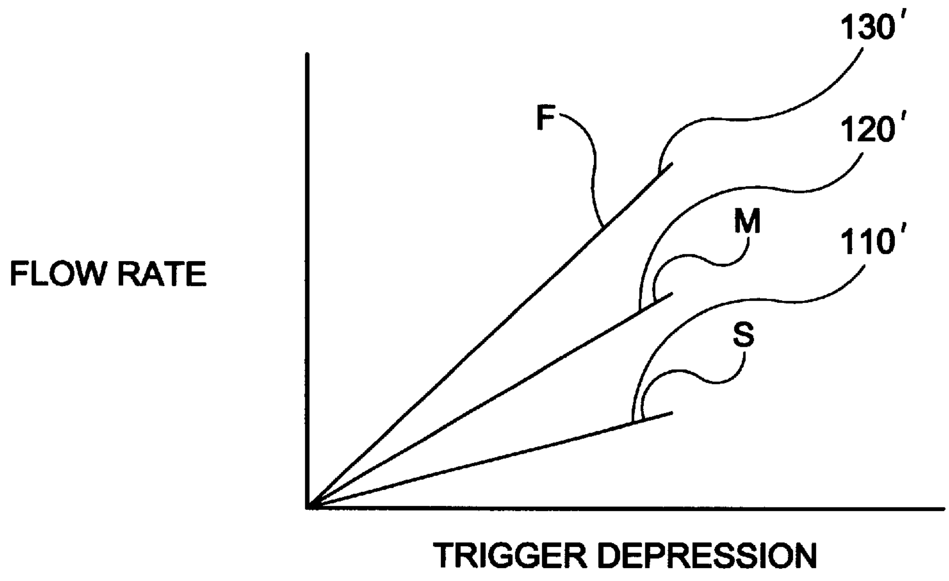
FIG-10 PRIOR ART
FIG. 10 is a graph showing trigger depression in relation to flow rate for a pipet gun according to the prior art.

FIG. 10 shows a graph in which trigger depression is plotted against flow rate for a prior art pipet gun as disclosed in U.S. Pat. No. 5,294,405. Lines 110', 120'and 130' represent trigger settings on the pipet gun at slow, medium and fast flow rates, respectively. The speed of such flow rates is determined by the size of the groove in the valve surface, as noted above, with the slow setting including a small groove which gradually tapers, providing a variable generally slow flow rate, a slightly larger groove which provides a variable generally medium flow rate slightly above the slow flow rate, As can be seen through lines 110', 120' and 130', the flow rate constantly increases as trigger depression increases.

Figure 11:
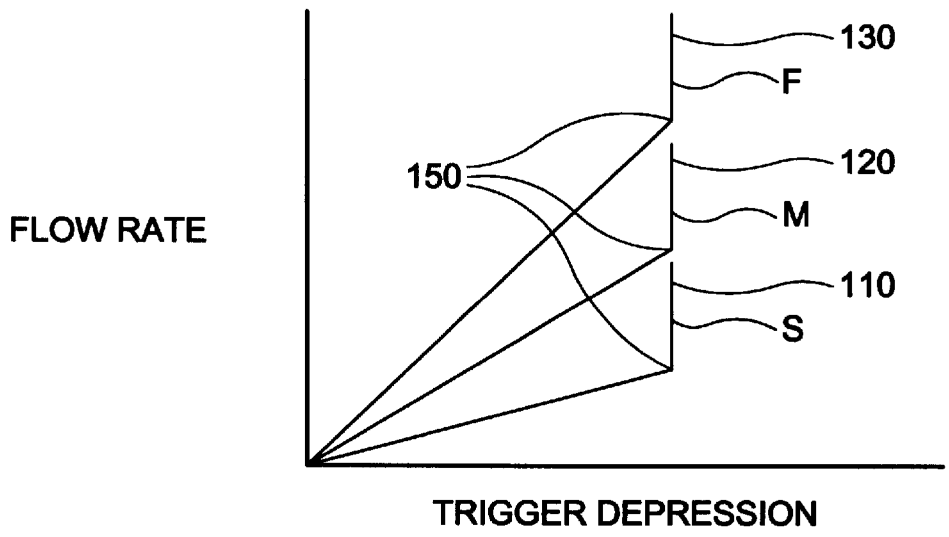
FIG. 11 is graph showing trigger depression in relation to flow irate for the pipet gun of the present invention.

FIG. 11 shows a graph in which trigger depression is plotted against flow rate for a pipet gun according to the present invention. Lines 110, 120 and 130 represent trigger settings on the pipet gun at slow, medium and fast flow rates, respectively. As can be seen, once the trigger is depressed a certain distance as noted at point 150, valve o-ring 39 sealingly engages extension sleeve 57, thus sealing any venting of chamber 51 to the ambient air. Such sealing causes a complete enclosure between pipet 90 and either the air pressure source or the vacuum source, depending on which valve is being operated at the time. When such sealing occurs, a sharp increase in the flow rate of air into or out of pipet 90 is evidenced, as depicted at point 150 in the graph of FIG. 11. Thus, an enhanced flow rate can be accomplished.

Operation of the pipet gun will now be described with reference to the Figures. In operation, pipet 90 is attached to pipet gun 10 at pipet support 80. The end tip of pipet 90 is then submersed in a liquid to be drawn into the pipet. The operator then depresses vacuum valve trigger 31", thus causing valve 30 associated with vacuum trigger 31" to be longitudinally displaced or moved within chamber bore 51 of chamber 50. Such displacement causes valve 30 to move from a first position in which valve surface 35 sealingly engages flow port 55 and covers chamber flow opening 54, to a second position in which groove 33 is in alignment with flow port 55. Since vacuum duct 24 provides fluid communication between chamber bore 51 and a vacuum source, a vacuum is established within chamber bore 51. With alignment of groove 33 and flow port 55, a path of fluid communication is established between chamber bore 51 and flow port 55 through groove 33, which in turn is in fluid communication with pipet flow duct 25 and, therefore pipet 90. Thus, the vacuum within chamber bore 51 causes a flow of fluid in through the pipet 90, through pipet support 80, through pipet flow duct 25 and into bore 51, thereby causing liquid to be drawn into pipet 90.

After a desired amount of liquid is drawn into pipet 90, vacuum valve trigger 31" is released, and the bias exerted by spring 34 causes vacuum valve trigger 31" with valve attached thereto to return to its original position, with valve surface 35 sealing flow port 55, and therefore closing off the path of fluid communication between valve chamber 51 and chamber flow opening 54.

After placing the pipet in a container into which the liquid contained within the pipet is to be expelled, pressure valve trigger 31' is partially depressed, as depicted in FIG. 2. Such partial depressing causes valve 30 associated with pressure trigger 31' to be longitudinally displaced or moved within chamber bore 51 of chamber 50. Such displacement causes valve 30 to move from a first position in which valve surface 35 sealingly engages flow port 55 and covers chamber flow opening 54, to a second position in which small groove portion **33*a* is in alignment with flow port 55. Since pressure duct 23 provides fluid communication between chamber bore 51 and an air pressure source, positive air pressure is established within chamber bore 51. With alignment of small groove portion 33*a* and flow port 55, a path of fluid communication is established between chamber bore 51 and flow port 55 through small groove portion 33*a*, which in turn is in fluid communication with pipet flow duct 25 and, therefore pipet 90. Thus, a path of positive air pressure as depicted by arrow A in FIG. 7 is established, with positive air pressure from the air pressure source traveling through pressure duct 23, through duct opening 53, into chamber bore 51, across small groove portion 33*a*, through flow port 55 and chamber flow opening 54, into extension conduit 27, through pipet flow duct 25 and into pipet 90. Further, as noted above, positive air pressure is also vented from valve chamber 50 at the point of engagement of stem portion 30*b* and extension sleeve 39 at open end 58, as shown in FIG. 7. With positive air pressure established within pipet 90**, fluid contained within the pipet is caused to be expelled therefrom.

During operation of the pipet, pressure trigger 31' can be further depressed, thereby causing further displacement of valve 30 within chamber bore 51, which in turn causes alignment between flow port 55 and the progressively tapered small groove portion **33*a*. Since small groove portion 33*a* is progressively tapered, it gradually increases in size, thereby permitting an increased level of fluid communication between chamber bore 51 and chamber flow opening 54, which increases the flow rate of air through pipet gun 10, and therefore increases the flow rate of liquid out of pipet 90**.

Figure 8:
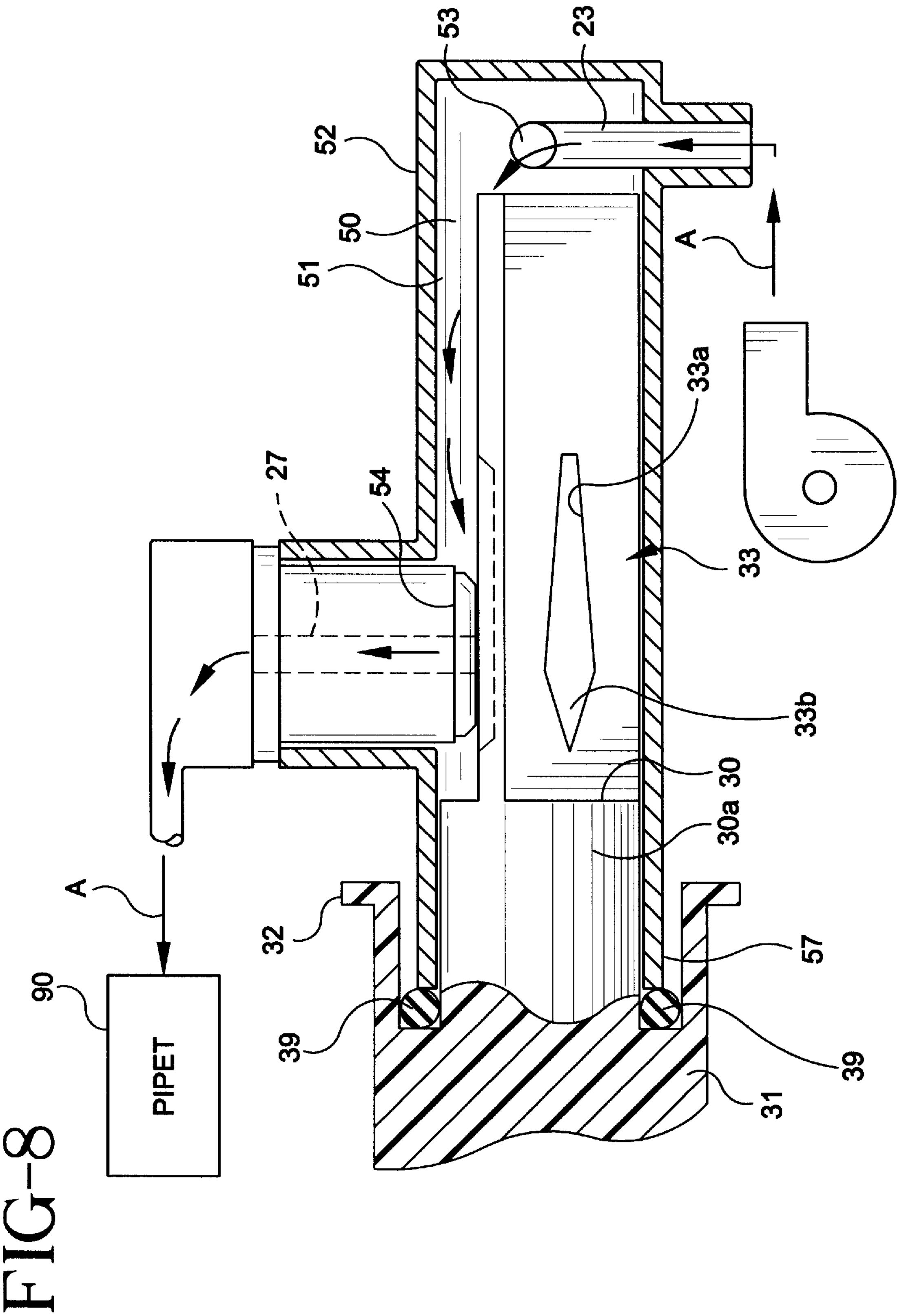
FIG. 8 is a schematic view similar to that shown in FIG. 7, showing operation of the valve assembly in a second position.

Still further, pressure trigger 31' is fully depressed during pipetting of the liquid, as depicted in FIG. 3. Such full depression causes further displacement of valve 30 within chamber bore 51, thereby causing large groove portion 33*b* to be aligned with flow port 55. Additionally, as shown in FIG. 8, such full depression of pressure trigger 31' causes valve O-ring 39 to sealingly engage extension sleeve 57, thereby preventing positive air flow A from venting from valve chamber 50. When pressure trigger 31' is fully depressed to align large groove portion 33*b* with flow port 55 and to cause valve o-ring 39 to engage extension sleeve 57, valve trigger rim 32 engages spring detent 70 across apex 70*a*, causing a click which is manually or audibly detectable, i.e., can be heard and/or felt by the pipet gun operator. Since large groove portion 33*b* is larger than the small groove portion 33*a*, and since valve o-ring 39 seals off valve chamber 50 from inventing, an increased level of fluid communication is established between chamber bcre 51 and chamber flow opening 54, thereby causing an increase in the flow rate of fluid out of the pipet. The click caused by valve trigger rim 21 engaging apex 70*a* of spring, detent 70 which is felt and/or heard by the operator provides an indication to the operator that the pipet gun is operating at the increased fluid rate, i.e., the "express mode" of operation.

While the present invention is described herein in terms of a preferred embodiment, it will be recognized by those skilled in the art that various changes to the foregoing described and shown structures can be made without departing from the scope of the present invention. Accordingly, the particularly disclosed scope of the invention is set forth in the following claims.

What is claimed is:

1. A pipet gun for pipetting fluids into and out from a pipet comprising:

a gun housing;

a pipet support, coupled to said housing for supporting said pipet to said housing;

air pressure supply means in communication with said pipet support for selectively supplying air pressure flow to said pipet for effecting said pipetting of said fluids;

regulating means supported by said housing for operably regulating the flow rate of said air pressure supplied to said pipet;

said regulating means including a manually-actuated trigger-operated valve;

said valve being continuously movable to progressively change said air flow rate from a first air flow rate to a second air flow rate which is greater than said first air flow rate; and said valve being movable to a final position to non-progressively change said air flow rate from said second air flow rate to a third air flow rate which is substantially greater than said second air flow rate.

2. A pipet gun of claim 1, wherein said valve is selectively adjustable among plural discrete positions so as to establish selected plural different air flow rates.

3. A pipet gun of claim 1 wherein air pressure supply means includes an air pressure source and an air conduit between said air pressure source and said pipet support, said valve being interposed between said air pressure source and said pipet along said conduit.

4. A pipet gun of claim 3 wherein said valve includes a valve opening alignable with said conduit so as to permit said change in said air flow rates.

5. A pipet gun of claim 4 wherein said valve opening is elongate having a progressively greater opening width along the length thereof to permit said progressive change in said air flow rate from said first flow rate to said second flow rate.

6. A pipet gun of claim 1 further including a valve chamber for accommodating said valve, said valve chamber having an opening for accommodating said valve for said progressive movement of said valve therein.

7. A pipet gun of claim 6 further including sealing means interposed adjacent said valve chamber for sealing said chamber opening upon movement of said valve to said final position.

8. A pipet gun of claim 7 wherein said sealing means includes an elastomeric sealing member supported by said valve for sealing engagement with said valve chamber opening.

9. A pipet gun of claim 8 wherein said elastomeric sealing member includes a rubber o-ring.

10. A pipet gun of claim 2 further including means for preventing movement of said valve to said final position when said valve is selectively adjusted to one of said plural discrete positions.

* * * * *